US011619291B2

(12) United States Patent
Ohashi et al.

(10) Patent No.: US 11,619,291 B2
(45) Date of Patent: Apr. 4, 2023

(54) DIFFERENTIAL DEVICE (71) Applicant: GKN Automotive Limited, Birmingham (GB)

(72) Inventors: Kazuhiro Ohashi, Tochigi (JP); Hideki Nonaka, Tochigi (JP); Koji Yamazaki, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/405,103

(22) Filed: Aug. 18, 2021

(65) Prior Publication Data

US 2021/0372513 A1 Dec. 2, 2021

Related U.S. Application Data (63) Continuation of application No. PCT/JP2019/007981, filed on Mar. 1, 2019.

(51) Int. Cl.
*F16H 48/24* (2006.01)
*F16H 48/08* (2006.01)
(Continued)

(52) U.S. Cl.
CPC ............ *F16H 48/24* (2013.01); *F16H 48/08* (2013.01); *F16H 57/0424* (2013.01); *F16H 57/0483* (2013.01); *F16H 48/40* (2013.01)

(58) Field of Classification Search
CPC .. F16H 48/24; F16H 57/0424; F16H 57/0457; F16H 57/0483
See application file for complete search history.

(56) References Cited

U.S. PATENT DOCUMENTS 2,106,946 A * 2/1938 Frederickson .......... F16H 48/24
74/650
6,959,799 B2 * 11/2005 Fusegi .................... F16H 48/34
192/93 A
(Continued)

FOREIGN PATENT DOCUMENTS

JP S49-23376 Y1 6/1974
JP H09-286254 A 11/1997
(Continued)

OTHER PUBLICATIONS

International Search Report and Written Opinion dated May 21, 2019 for PCT/JP2019/007981 (7 pages; with English machine translation).

*Primary Examiner* — Ernesto A Suarez
*Assistant Examiner* — James J Taylor, II
(74) *Attorney, Agent, or Firm* — Bejin Bieneman PLC (57) ABSTRACT A differential device is provided with: a ring gear having a tooth row arranged around an axis to mesh with an input gear; an outer case combined with the ring gear and rotatable about the axis; an inner case rotatable about the axis relative to the outer case and having a toothed end with axially projecting dog teeth; a differential gear set supported by the inner case and to be coupled with a pair of axles to allow differential motion between the axles; a clutch member engaging with the outer case and disconnectably connecting with the dog teeth so as to prevent the inner case from rotating relative to the outer case; and perforations penetrating the outer case and opened on an outer face of the outer case, the perforations being so disposed as to expose the dog teeth radially outwardly from the outer case.

4 Claims, 7 Drawing Sheets

(51) Int. Cl.
*F16H 57/04* (2010.01)
*F16H 48/40* (2012.01)

(56) References Cited

U.S. PATENT DOCUMENTS

| | | | | |
|---|---|---|---|---|
| 7,892,134 | B2 * | 2/2011 | Fusegi | F16H 48/34 |
| | | | | 475/235 |
| 8,858,384 | B2 * | 10/2014 | Fusegi | F16H 48/08 |
| | | | | 74/423 |
| 9,797,495 | B2 * | 10/2017 | Inose | F16D 27/108 |
| 9,885,413 | B2 * | 2/2018 | Martini | F16H 48/10 |
| 10,173,525 | B2 * | 1/2019 | Kamitani | B60K 17/165 |
| 2008/0108471 | A1 * | 5/2008 | Deutsch | F16H 57/0483 |
| | | | | 475/331 |

FOREIGN PATENT DOCUMENTS

| | | |
|---|---|---|
| JP | H10-16602 A | 1/1998 |
| JP | 2011-112114 A | 6/2011 |

\* cited by examiner

DIFFERENTIAL DEVICE

CROSS-REFERENCE TO RELATED APPLICATIONS

This application is a continuation application of, and claims priority to, PCT Application No. PCT/JP2019/007981 (filed Mar. 1, 2019), the entire contents of which are incorporated herein by reference in their entirety.

TECHNICAL FIELD

The disclosure herein relates to a differential device for disconnectably connecting an input gear to a pair of axles, and in particular relates to a differential device having a structure beneficial in lubrication throughout the structure although it requires a relatively small amount of lubricant oil.

BACKGROUND

As right and left axles in a vehicle do not necessarily rotate in an equal speed, it is required to allow differential motion therebetween. To transmit torque to both the axles with enabling differential motion therebetween, a differential device is used.

A certain kind of a differential device is configured to have an ability to mechanically cut off axles from a propeller shaft. A device as an example thereof, referred to as a free-running differential or such, is provided with an outer case drivingly and steadily coupled with a propeller shaft and an inner case disconnectably connected therewith via a clutch, in which a differential gear set is coupled with the inner case. Torque is, only when the clutch is connected, transmitted via the differential gear set to the axles and, when it is disconnected, the axles are allowed to freely rotate. This kind of a differential device, without using any other disconnection device, enables agile switching between a two-wheel driving mode and a four-wheel driving mode.

SUMMARY

The device described above necessarily contains a nesting structure constituted of the inner case and the outer case. As the folded structure impedes circulation of lubricant oil between the interior and the exterior thereof, certain attention should be paid to burnout control. Thus, where the lubricant oil is fed into a differential carrier to the extent that the axles are immersed therein or more and the lubricant oil intrudes through the axles into the differential device and is, by centrifugal force by rotation thereof, made to circulate outward, the differential device is thus everywhere lubricated. Studies by the present inventors have demonstrated that such abundant lubricant oil may, as creating resistance to rotation, impair energy efficiency. Although reduction in amount of the lubricant oil may solve this issue, then the lubricant oil cannot be supplied through the axles and the issue of burnout may be newly raised because the aforementioned centrifugal force tends to keep the lubricant oil away from the interior of the differential device. The device disclosed hereafter has been created in light of these problems.

According to an aspect, a differential device housed in a carrier along with lubricant oil and disconnectably connecting an input gear to a pair of axles is provided with: a ring gear having a tooth row arranged around an axis to mesh with the input gear; an outer case combined with the ring gear and rotatable about the axis; an inner case rotatable about the axis relative to the outer case and having a toothed end with axially projecting dog teeth; a differential gear set supported by the inner case and to be coupled with the pair of axles to allow differential motion between the axles; a clutch member engaging with the outer case and disconnectably connecting with the dog teeth so as to prevent the inner case from rotating relative to the outer case; and perforations penetrating the outer case and opened on an outer face of the outer case, the perforations being so disposed as to expose the dog teeth radially outwardly from the outer case.

DESCRIPTION OF EMBODIMENTS

Exemplary embodiments will be described hereinafter with reference to the appended drawings. Throughout the following description and the appended claims, an axis means a rotational axis of a differential device, which is usually consistent with a center of the axles. Further, an axial direction means a direction parallel thereto, a radial direction means a direction perpendicular thereto, and a circumferential direction means a direction a direction going around the axis.

The following description exemplarily relates to a differential device of a kind referred to a "free-running differential". It is, however, selected for the purpose of convenience of explanation and the description is neither exhaustive nor limiting.

Figure 1:
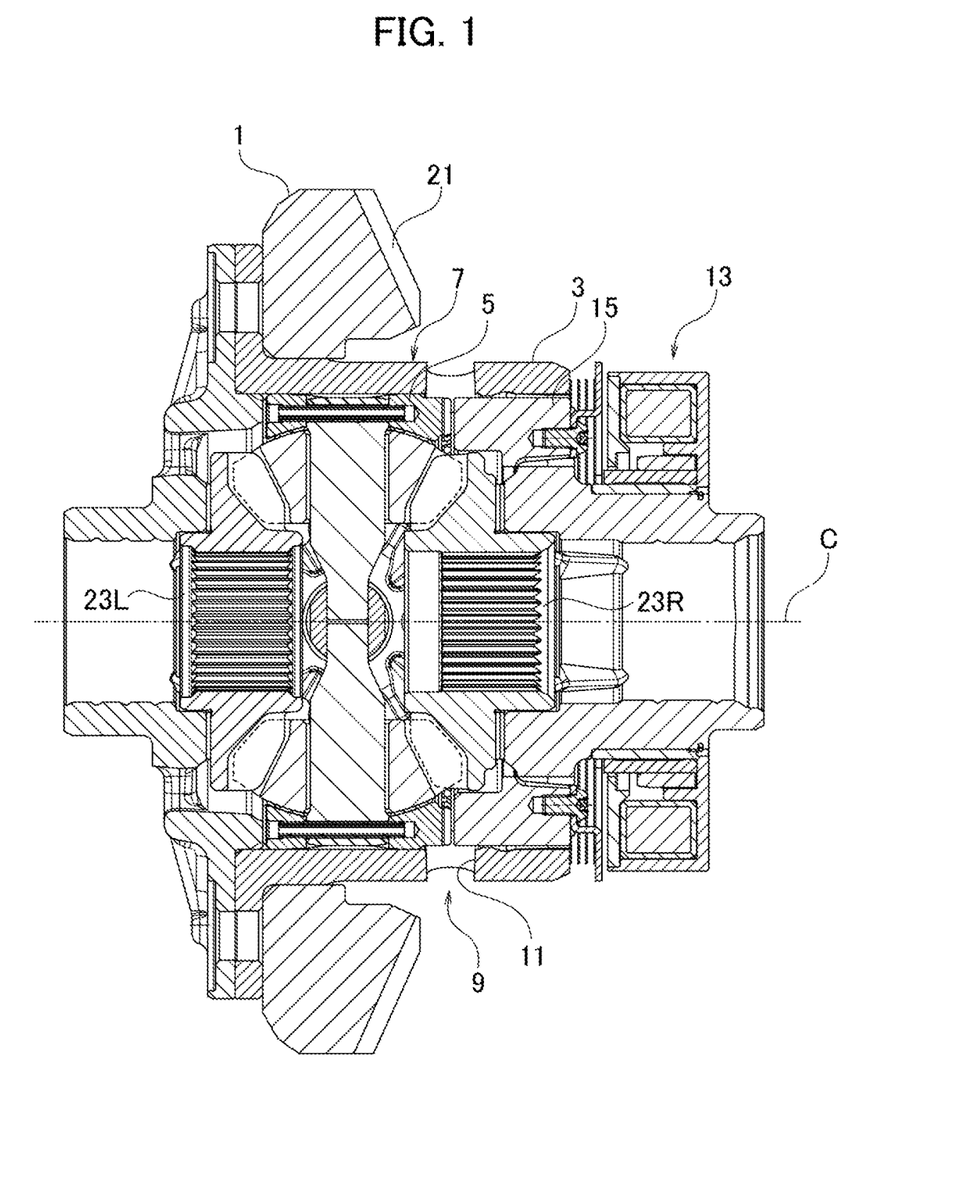
FIG. 1 is a sectional elevational view of a differential device according to an embodiment.

The differential device shown in FIG. 1 disconnectably connects a propeller shaft having an input gear with a pair of axles. The differential device is provided with a ring gear 1 in mesh with an input gear not shown therein, an outer case 3 combined with the ring gear 1 and rotatable about an axis C, an inner case fitting in and rotatable relative to the outer case 3, a differential gear set 7 supported by the inner case 5, a clutch member 15 that in combination with the inner case 5 constitutes a clutch 9, and an actuator 13 switching the clutch 9 between a connected state and a disconnected state.

When the clutch 9 is disconnected, the inner case 5 is capable of freely rotating relative to the outer case 3.

However, when the clutch 9 is connected, the inner case 5 is anti-rotated relative to the outer case 3 as the clutch member 15 engages with the outer case 3, thereby transmitting torque between the outer case 3 and the inner case 5. The differential gear set 7 is provided with side gears 23R, 23L respectively coupled with the axles and thereby transmit the torque with allowing differential motion therebetween.

The ring gear 1 is provided with a tooth row 21 arranged around the axis C to mesh with the input gear. The tooth row may be any of a spur gear radially projecting relative to the axis C, a helical gear and a face gear projecting axially, yet it may be a bevel gear tooth row oblique to the axis C and may be slanted toward the outer case 3. Although details will be described later, the bevel gear tooth row 21 slanted toward the outer case 3 is beneficial in directing lubricant oil expelled thereby toward the interior of the differential device. While a so-called hypoid gear is applicable to the tooth row 21, it is not indispensable.

The differential gear set 7 is supported by the inner case 5 and is so constituted as to output the input torque to the side gears 23R, 23L and also allow differential motion therebetween. Pinions rotatable about a shaft supported by the inner case 5 mesh with the side gears 23R, 23L, each of which is provided with splines on its internal face for example and thereby combined with the right or left axle. More specifically, the differential gear set 7 outputs the torque inputted into the inner case to both the axles with allowing differential motion therebetween. While this explanation is based on a structure of a bevel gear type shown in FIG. 1, any other type such as a face gear type or a planetary gear type is applicable to the differential gear set 7.

Figure 4:
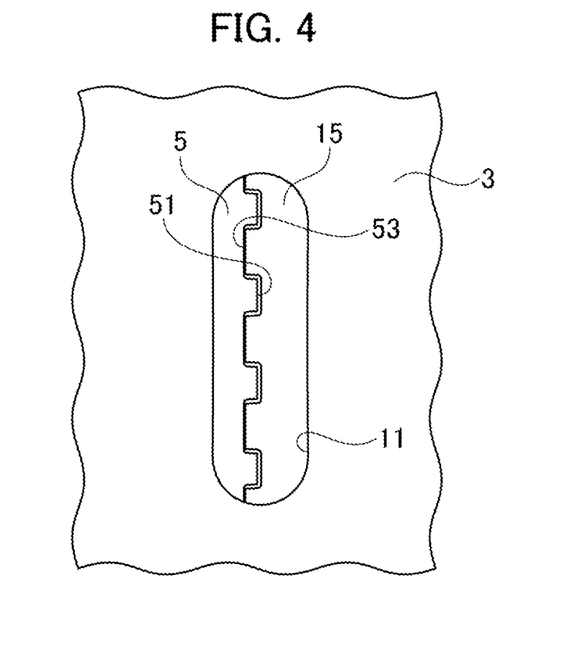
FIG. 4 is a plan view of an outer case mainly showing an aspect where clutch teeth are exposed through an opening, in a state where the clutch is connected.
Figure 5:
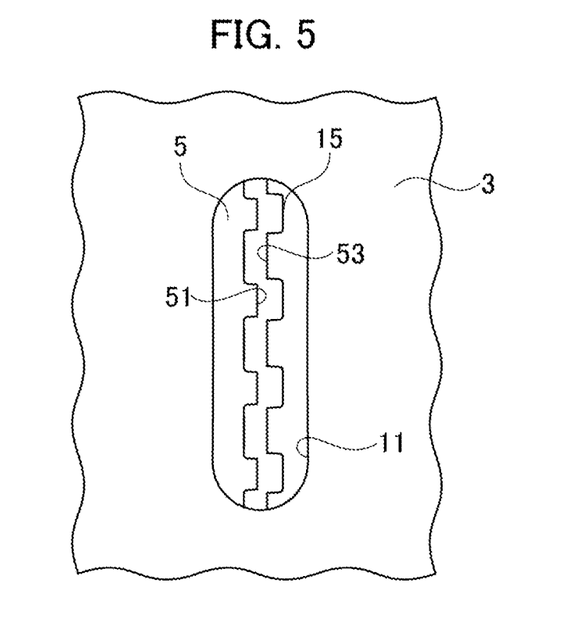
FIG. 5 is a plan view of an outer case mainly showing an aspect where clutch teeth are exposed through an opening, in a state where the clutch is disconnected.

The inner case 5 is not fixed to the outer case 3 but is freely rotatable about the axis at least when the clutch 9 is disconnected. Referring to FIGS. 4 and 5 in combination with FIG. 1, one end of the inner case 5 is toothed to have dog teeth 51 standing axially and correspondingly the clutch member 15 is provided with dog teeth 53, thereby the combination thereof constitutes the clutch 9. The clutch member 15, at another end opposite to the dog teeth 53, engages with the outer case 3 and receives the torque from the outer case 3 to rotate together. As shown in FIG. 4, when the clutch 9 is connected, the differential device transmits the torque from the propeller shaft to the axles but, when the clutch 9 is disconnected as shown in FIG. 5, the axles get free from the propeller shaft.

According to the present embodiment, the inner case 5 is constrained by the outer case 3 via the side gears 23R, 23L and is thus substantially immovable in the axial direction. As the clutch member 15 axially moves, switching between the connected and the disconnected states is effected. Instead applicable is a structure in which the clutch member 15 is immovable and the inner case 5 moves to effect switching.

The actuator 13 is, in this embodiment, a device for driving the clutch member 15 in the axial direction to control connection and disconnection of the clutch 9. An example thereof is, as shown in the drawing, a combination of an electrically excitable solenoid, a plunger driven by the solenoid and a spring biasing the plunger in the reverse direction. The plunger, by axially pressing the clutch member 15, makes the clutch 9 connected, whereas the spring promotes disconnection. Of course, instead applicable is any other driver such as a hydraulic device, a pneumatic device or a motor-driven cam mechanism.

Figure 2:
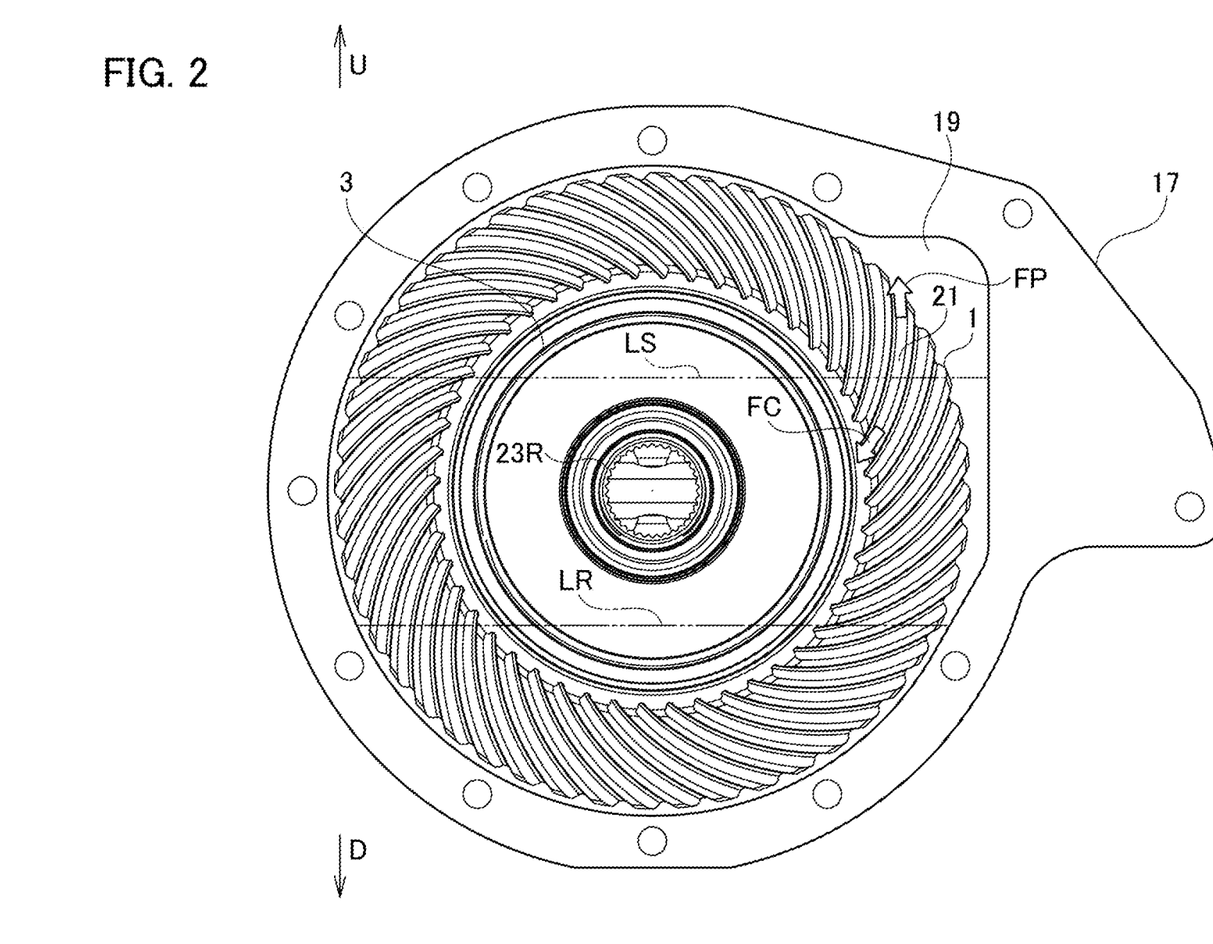
FIG. 2 is a side view of the differential device housed in a carrier.

Referring to FIG. 2, the differential device is, along with lubricant oil, housed in the carrier 17. In the meantime, in FIG. 2, the arrow U denotes upward relative to the direction of gravity, and the arrow D downward. One of the axles is combined with the side gear 23R shown in the center of the drawing, and another is combined with the side gear 23L not shown therein.

Figure 3:
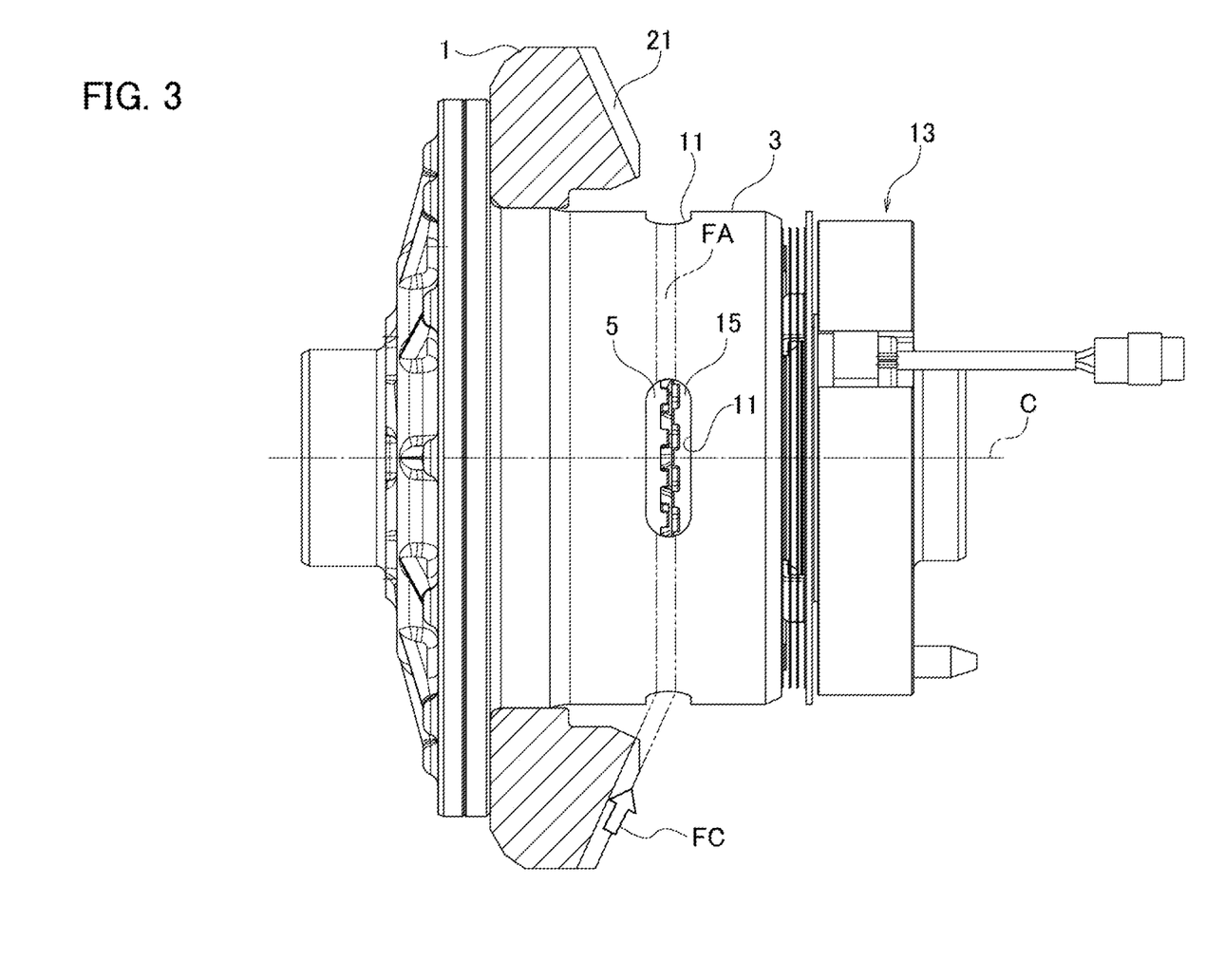
FIG. 3 is an elevational view of the differential device, showing its ring gear only in its partial section.

In a cavity 19 in the carrier 17 enclosed is lubricant oil, which in a resting state reaches the line LS or LR for example, so as to lubricate the respective parts of the differential device. The outer case 3 is, as shown in FIGS. 1 and 3, provided with perforations 11 to promote inflow and outflow of the lubricant oil, and the perforations 11 penetrate the outer case 3 and open on its outer face to establish communication between its interior and exterior. The differential device is further provided with communication holes for communicating the interior and the exterior of the inner case 5. Gaps between the dog teeth 51, 53 can serve as an example thereof, whereas details about the communication holes will be described later.

Referring again to FIG. 2, if the lubricant oil is enclosed in the cavity 19 to such an extent as to reach the axles or more, it is expected that the lubricant oil intrudes through the axles into the differential device and is further directed by centrifugal force created by rotation from the inner case 5 toward the outer case 3. A circulation is established, in which the lubricant oil expelled from the perforations 11 flows again along the axles and intrudes into the differential device. This embodiment would not limit arrangement of respective members and the perforations 11, relatively.

If the enclosed lubricant oil is not abundant enough to reach the axles as illustrated by the line LR, its circulation created by centrifugal force as described above cannot be expected. The present inventors have found that the meshed ring gear 1 has an ability to expel lubricant oil. More specifically, during the ring gear 1 rotates about the axis C, the tooth row 21, when passing around the lowermost end of the cavity 19, picks and lifts up lubricant oil there and, when meshing with the input gear of the propeller shaft, expels it along gear faces. This ability can be employed for supplying lubricant oil into the differential device. This ability is, however, not observable when sufficiently abundant lubricant oil is enclosed but becomes apparent when a relatively small amount of oil is enclosed. In particular in a case where a bevel gear tooth row oblique to the axis C is applied to the tooth row 21, it creates both centrifugal flow FP and centripetal flow FC. It is thus beneficial in directing the lubricant oil toward the outer case 3 and is more beneficial if the tooth row 21 is slanted toward the outer case 3.

Referring mainly to FIG. 3, to better utilize the flow FC, the perforations 11 may be aligned with the gaps between the dog teeth 51, 53. Because the inner case 5 is axially immovable, where the dog teeth 51 are so disposed as to be steadily exposed radially outwardly from the outer case 3 through the perforations 11, the perforations 11 and the gaps get aligned. In a case where the clutch member 15 is immovable instead, related elements may be disposed on the basis of the dog teeth 53. Such an arrangement is beneficial not only in receiving the flow FC and then conducting the lubricant oil into the interior of the inner case 5 but also in expelling the lubricant oil from between the dog teeth 51, 53 when the clutch 9 is to be connected, thereby facilitating connection of the clutch 9.

The perforations 11 may be so arranged as to elongate along, or aligned with, or overlap with an area FA bathed in the flow FC created by the bevel gear tooth row 21. For example, the perforations 11 may be arranged to meet a circumferential area where an extrapolation of the tooth row 21 crosses the outer face of the outer case 3. For more detail, two outer circumferential lines drawn by lines where extrapolations of tooth heads and tooth bottoms of the tooth row 21 cross the outer face of the outer case 3 could be recognized as the area FA bathed in the flow FC of the lubricant oil, and the perforations 11 may be arranged along this area.

Figure 8:
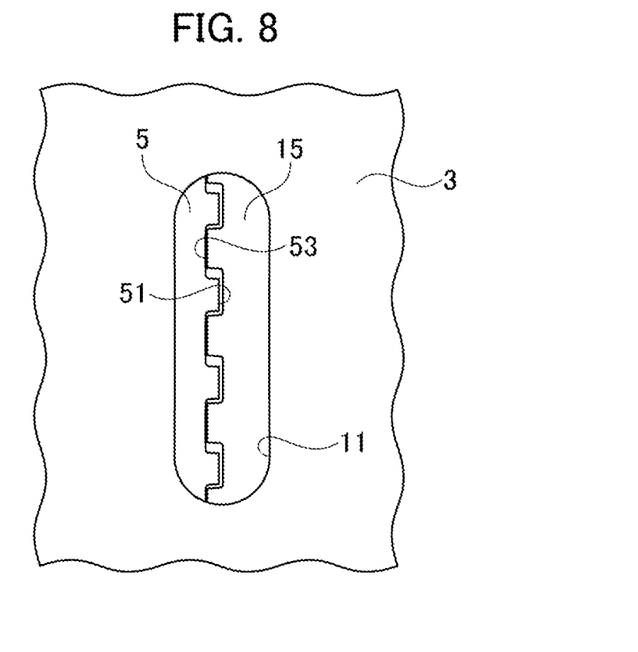
FIG. 8 is a plan view mainly showing clutch teeth according to an alternative embodiment.
Figure 9:
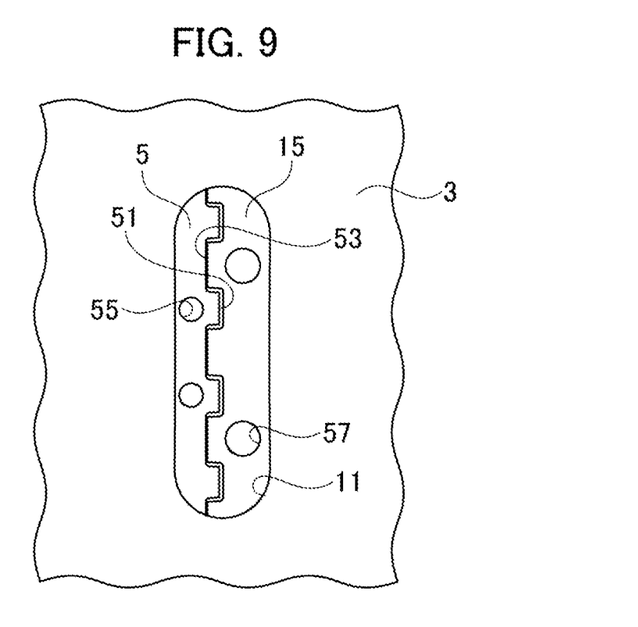
FIG. 9 is a plan view mainly showing clutch teeth according to another alternative embodiment.
Figure 10:
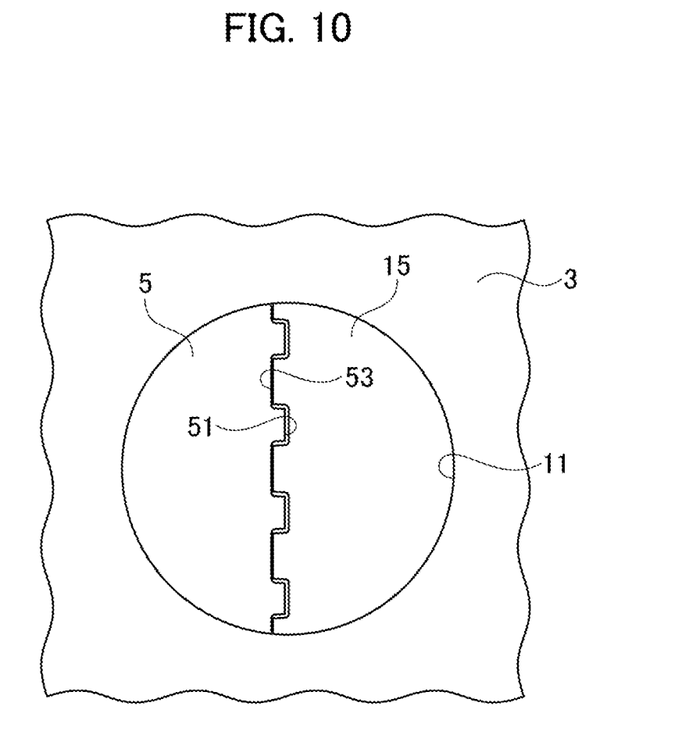
FIG. 10 is a plan view mainly showing an opening according to another example.

Each of the perforations 11 may be, as shown in FIG. 10, circular but may be instead oval or ellipsoidal elongated along the area FA as shown in FIGS. 4 through 9. Or, alternatively, if possible, it may be a rectangle or any shape equivalent to any of these shapes.

Figure 6:
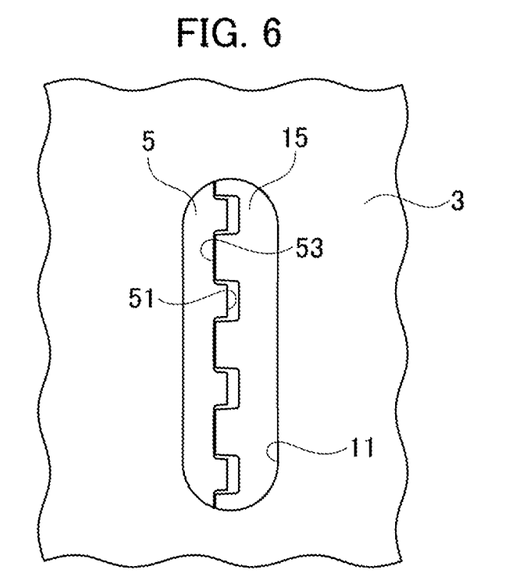
FIG. 6 is a plan view mainly showing clutch teeth according to another embodiment.

As with the communication holes for introducing the lubricant oil into the inner case 5, the gaps between the dog teeth 51, 53 can be employed as described already. The dog teeth 51, 53, even when meshing together, leave the gaps, for example between side faces (in the circumferential direction) of the teeth. To assure larger communication holes, as shown in FIG. 4, the dog teeth 51, 53 are so dimensioned as to keep the tooth heads of the dog teeth 51 apart from the tooth bottoms of the dog teeth 53. Of course instead they may be so dimensioned as to keep the tooth heads of the dog teeth 53 apart from the tooth bottoms of the dog teeth 51. As shown in FIG. 4, not only side faces (in the circumferential direction) of the teeth but also gaps between the tooth heads and the tooth bottoms form the gaps (also in the axial direction) for functioning as communication holes for conducting the lubricant oil. Further as shown in FIG. 6, the dimensions of the dog teeth 51, 53 can be so regulated as to widen the gaps.

Figure 7:
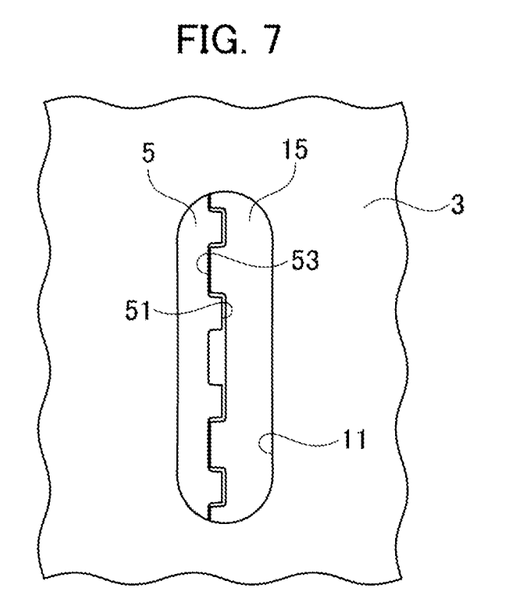
FIG. 7 is a plan view mainly showing clutch teeth according to still another embodiment.

Or, in place of or in addition to these structures, as shown in FIG. 7, the dog teeth 51, 53 may be partially cut out. Each cutout widens the communication holes. The cutout is not limited to a single but plural cutouts can be provided and arranged so that any of them can be exposed through the perforations 11 constantly. As far as the rests of engagements between the dog teeth are sufficient to bear the torque, such a structure can be employed.

Still in place of or in addition to these structures, as shown in FIG. 8, tooth bottoms of any of the dog teeth 51, 53 may be elongated than tooth heads of others, thereby widening the gaps in the circumferential direction.

Still further in place of or in addition to these structures, as shown in FIG. 9, any one or both of the inner case 5 and the clutch member 15 may be provided with through-holes 55, 57. The through-holes 55, 57 may be a single but a plural, and may be arranged so that any of them can be exposed through the perforations 11 constantly.

Any of the aforementioned embodiments can employ centripetal flow of lubricant oil created by the ring gear to introduce the lubricant oil into the device and thereby lubricate respective parts therein. These structures successfully lubricate respective parts in the device even if the amount of the lubricant oil is reduced and yet decrease resistance to rotation by the lubricant oil, thereby improving energy efficiency.

Although certain exemplary embodiments are described above, modifications and variations of the embodiments will occur to those skilled in the art, in light of the above teachings.

What is claimed is:

1. A differential device housed in a carrier along with lubricant oil and disconnectably connecting an input gear to a pair of axles, comprising:
    a ring gear having a tooth row arranged around an axis to mesh with the input gear;
    an outer case combined with the ring gear and rotatable about the axis;
    an inner case rotatable about the axis relative to the outer case and having a toothed end with axially projecting dog teeth;
    a differential gear set supported by the inner case and to be coupled with the pair of axles to allow differential motion between the axles;
    a clutch member engaging with the outer case and disconnectably connecting with the dog teeth so as to prevent the inner case from rotating relative to the outer case;
    perforations penetrating the outer case and opened on an outer face of the outer case, the perforations being so disposed as to expose the dog teeth radially outwardly from the outer case; and
    a communication hole so disposed as to be exposed via the perforations to communicate an exterior of the outer case with an interior of the inner case at least where the dog teeth mesh with the clutch member;
    wherein the communication hole includes a plurality of holes opened on one or more of the inner case and the clutch member, and the plurality of holes are so disposed as to expose at least one of the holes via the perforations, and
    wherein the perforations are arranged along an area bathed in a flow of the lubricant oil created by the tooth row of the ring gear.

2. The differential device of claim 1, wherein the tooth row comprises bevel gear teeth oblique to the axis.

3. The differential device of claim 1, wherein the clutch member comprises second dog teeth to connect with the dog teeth, and the second dog teeth are so dimensioned as to leave a gap to serve as the communication hole even where the second dog teeth connect with the dog teeth.

4. The differential device of claim 1, wherein each of the perforations forms one of an oval, an ellipse or a rectangle elongated in a circumferential direction of the outer case along the area.

\* \* \* \* \*